W. H. ZACHMANN.
TRANSMISSION DEVICE.
APPLICATION FILED AUG. 4, 1911.

1,053,119.

Patented Feb. 11, 1913.

2 SHEETS—SHEET 1.

Witnesses:
Victor D. Borst
Wm. Ashley Kelly

Inventor:
William H. Zachmann
by Henry B. Williams
Attorney.

W. H. ZACHMANN.
TRANSMISSION DEVICE.
APPLICATION FILED AUG. 4, 1911.
1,053,119.
Patented Feb. 11, 1913.
2 SHEETS—SHEET 2.
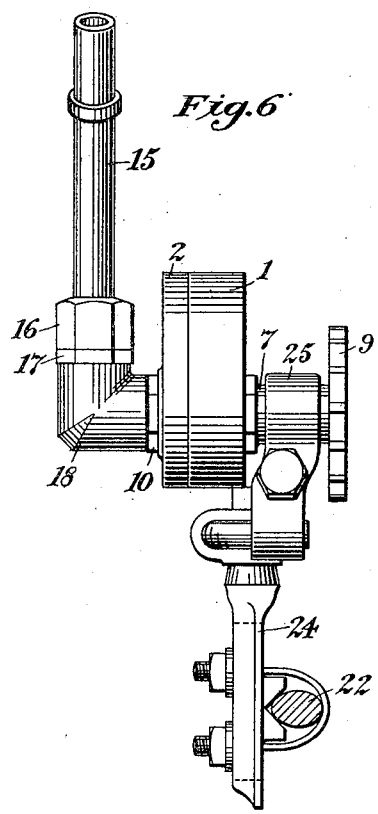
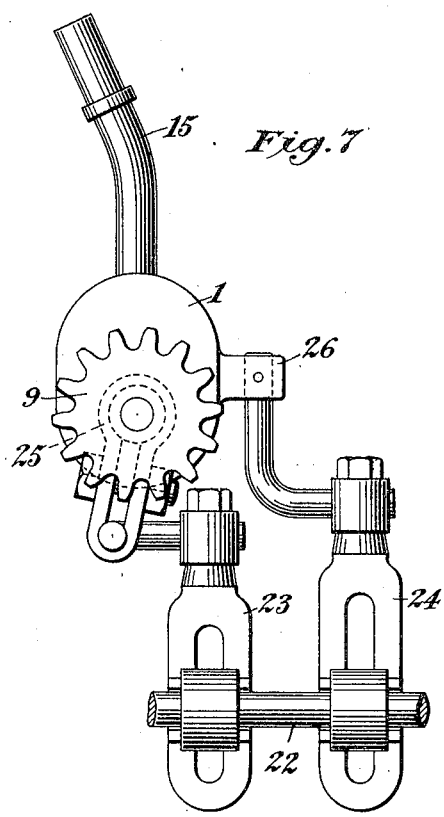
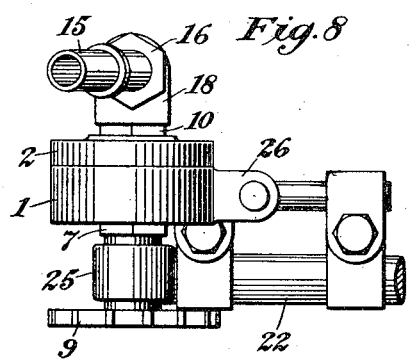
Witnesses:
Inventor:
William H. Zachmann
by Henry D. Williams
Attorney.

UNITED STATES PATENT OFFICE.

WILLIAM H. ZACHMANN, OF WOODHAVEN, NEW YORK, ASSIGNOR TO AMERICAN EVER READY COMPANY, A CORPORATION OF NEW YORK.

TRANSMISSION DEVICE.

1,053,119.      Specification of Letters Patent.      Patented Feb. 11, 1913.

Application filed August 4, 1911. Serial No. 642,390.

*To all whom it may concern:*

Be it known that I, WILLIAM H. ZACHMANN, a citizen of the United States, residing at Woodhaven, borough of Queens, city of New York, in the county of Queens and State of New York, have invented a certain new and useful Improvement in Transmission Devices, of which the following is a specification, reference being had therein to the accompanying drawings, forming part thereof.

My invention relates to mechanisms for the transmission of power, and means embodying my invention are particularly adapted to transmit power from a moving part of a vehicle, such as a wheel, to vehicle-driven registering devices, such as fare registers or taximeters. As is well known, such transmission mechanisms necessarily effect a very considerable reduction in movement. For example, in the case of taximeters which receive four actuations in a mile and which are driven from vehicle wheels of thirty-two inches diameter, the reduction from the vehicle-wheel to the number-wheels of the taximeter must be approximately 160 to 1, since, in progressing a quarter of a mile, the vehicle-wheel rotates substantially one hundred and sixty times. Ordinarily the greater part of this reduction occurs in the connection between the vehicle-wheel and the flexible shaft which transmits the movement to the taximeter, and a worm drive is most commonly employed to effect this reduction.

One of the objects of my invention is to provide a transmission mechanism for this purpose which will be of maximum durability.

Other objects are compactness, simplicity and economy of construction, and reliability of operation.

Still other objects and advantages of my invention will appear from the following description.

I shall now describe the embodiment of my invention illustrated in the accompanying drawings, and shall thereafter point out my invention in claims.

Figure 1:
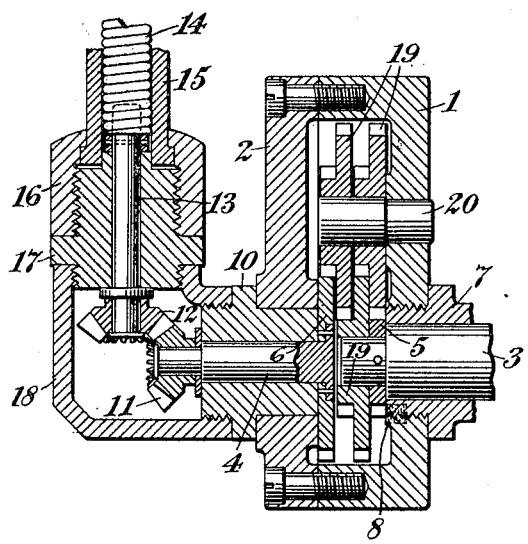
Figure 2:
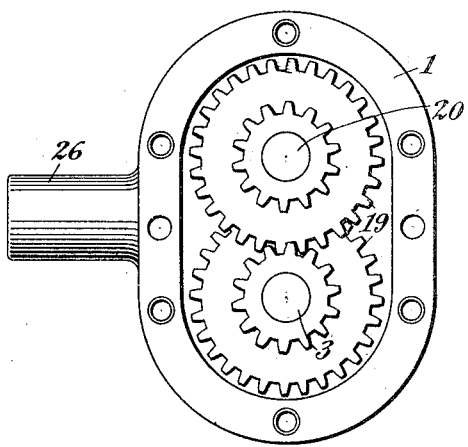
Figure 3:
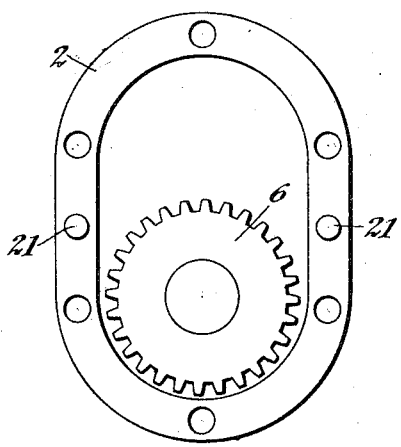
Figures 4, 5:
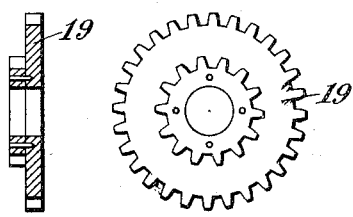

Figure 1 is a central longitudinal section of a mechanism embodying my invention. Fig. 2 is an elevation of the casing with the cover removed, showing the interior thereof. Fig. 3 is an inner face view of the cover. Figs. 4 and 5 are, respectively, a face view and a central transverse section of a member of the gear train. Figs. 6, 7 and 8 are, respectively, side and rear elevations and a plan view, on a reduced scale, of the complete mechanism attached to a steering arm of a vehicle.

In the illustrated embodiment of my invention, I employ a two-part casing comprising a body portion 1 and a removable cover 2, attached in any suitable way, as by screws, and in this case is inclosed a gear train which will be described hereinafter. Two dowel pins 21 are provided in the cover to assure the proper fitting together of the body and cover. In the body portion 1 is journaled a stub shaft 3, which I term the driving shaft, and in the cover 2 is journaled a shorter stub shaft 4, which I term the driven shaft, the two shafts being in alinement when the casing is closed. The driving shaft 3 has its inner end, which projects into the casing, of reduced diameter, leaving a shoulder, and on this reduced end, alongside of the shoulder, is pinned or otherwise fixed a pinion 5. On the inner end of the driven shaft 4 is pinned or otherwise fixed a gear wheel 6.

The driving shaft 3 has its bearing in a hollow plug member 7, which screws into a screw-threaded bore in the casing and is locked therein, as by a screw plug 8. The pinion 5 bears against the inner face of this plug and thereby holds the driving shaft 3 in place. On the outer end of the driving shaft 3 is fixed a spur gear wheel 9, which is adapted to mesh with and be driven by a gear wheel on the hub of a wheel of the vehicle in the usual way.

The driven shaft 4 has its bearing in a hollow plug 10, which is inserted in a smooth bore in the cover 2, and on the other end of the shaft 4, which projects from the plug 10 and is reduced in diameter, is fixed a bevel gear 11, which meshes with a bevel gear 12 on a stub shaft or stem 13, attached to a short section of flexible shaft 14. Through these connections the gear wheel 6 drives the flexible shaft 14. The section of flexible shaft 14 is operatively connected to the usual flexible shaft, and is contained in a rigid swiveled bent tube 15, which has a flanged inner end clamped between a cap nut 16 and a hollow plug 17 on which the cap nut screws and which serves as a bearing for the stem 13. The plug 17 screws into an elbow tube 18, which is screwed upon the outer end of the plug 10 and serves as a casing for the bevel gears 11 and 12.

To operatively connect the pinion 5 and the gear wheel 6, a removable train of reducing gears is employed suitably mounted in the casing. As shown, this train consists of three double-gear members 19, such as illustrated in Figs. 4 and 5. These double-gear members comprise a gear wheel of the size of the gear wheel 6, and a pinion of the size of the pinion 5, arranged co-axially with and pinned to the gear wheel. Extending from the side of the body portion 2 is a stud 20, on which two of the double-gear members are mounted, one alongside the other, the third being mounted on the inner reduced end of the shaft 3 alongside of the pinion 5. The parts are so designed that, when the casing is closed, the pinion 5 meshes with the gear wheel of the member 19, which is immediately above the pinion 5 and on the stud 20, and the pinion of this member meshes with the gear wheel of the member 19, which is on the shaft 3, and the pinion of this member meshes with the gear wheel of the other member 19 on the stud 20, and the pinion of this member meshes with the gear wheel 6.

As shown, the gear wheels have twice as many teeth as the pinions and hence each reduction is 2 to 1, and since there are four such reductions, the total reduction is 16 to 1.

The casing is attached to the steering arm 22 (a portion of which is shown) by two links 23 and 24, the former of which is clamped to the neck of the plug member 7 by a clamping member 25, and the latter of which is attached to an ear 26 on the casing, as shown. These parts serve as the well-known universal bracket by means of which the casing may be adjusted and secured in any position relative to the steering knuckle, and held with the spur gear wheel 9 in mesh with its driving gear on the hub of the wheel.

It will be noted that, while I have in my construction eliminated worms, which are short lived, and employ only gearing, which is subjected to a rolling instead of a rubbing action, and hence will wear much longer, my construction is extremely simple and compact and affords easy access for the repair and replacement of parts. Furthermore, the parts subjected to the greater wear are tightly incased so that dust is effectively excluded and the parts may be effectively and constantly lubricated.

It is obvious that various modifications may be made in the construction shown and above particularly described within the principle and scope of my invention.

I claim:—

1. A transmission mechanism for vehicle-driven registering devices, comprising, in combination with flexible means for connection with a registering device, a casing including two separable parts, a driving and a driven shaft, one journaled in each part of the casing and the driven shaft having operative connection with the flexible means, a gear wheel permanently fixed on the inner end of each shaft, a driving gear on the outer end of the driving shaft arranged to have operative connection with a vehicle wheel, and a train of reducing gearing comprising a plurality of double-gear members suitably mounted in the casing and arranged to operatively connect the two gears on the inner ends of the shafts when the casing is closed.

2. A transmission mechanism for vehicle-driven registering devices, comprising, in combination with flexible means for connection with a registering device, a casing including two separable parts, a driving and a driven shaft, one journaled in each part of the casing and the drive shaft having operative connection with the flexible means, a gear wheel permanently fixed on the inner end of each shaft, a driving gear on the outer end of the driving shaft arranged to have operative connection with a vehicle-wheel, a gear-carrying stud projecting inwardly from one of the parts of the casing, and reducing gearing comprising a plurality of gear members loosely mounted, some on the stud and others on one of the shafts and arranged to operatively connect the two gears on the inner ends of the shafts when the casing is closed.

3. A transmission mechanism for vehicle-driven registering devices, comprising, in combination with a flexible shaft and with suitable attaching means, a casing including a body portion and a removable cover; a gear-carrying stud projecting from the bottom of the body portion, a driving shaft journaled in the body portion, a pinion fixed on the inner end thereof, and a driving gear-wheel on the outer end thereof arranged to have operative connection with a vehicle wheel, a driven shaft journaled in the cover portion and having operative connection with the flexible shaft, a gear-wheel fixed on the inner end of the driven shaft, and a removable train of reducing gears in the casing comprising a plurality of double-gear members loosely mounted some on the gear-carrying stud and some on the driving shaft and arranged to transmit actuation from the driving to the driven shaft.

4. A transmission mechanism for vehicle-driven registering devices, comprising, in combination with a flexible shaft, a casing in two parts including a body portion and a cover, a gear-carrying stud projecting from one of the parts and a driving shaft extending into the casing and journaled in said part, a pinion fixed on the inner end of the driving shaft, a driven gear fixed on the outer end of the rotatable stud and arranged to have operative connection with a vehicle wheel and to rotate the driving shaft and pinion, suitable attaching means for holding the driving gear in operative engagement with the vehicle wheel, flexible-shaft-driving means carried by the other part and connected to rotate the flexible shaft, and a train of reducing gears, a plurality of double-gear members loosely mounted, some on the stud and some on the driving shaft and operatively arranged to receive actuation from the said pinion and to transmit actuation to the flexible-shaft-driving means when the casing is closed.

In testimony whereof I have affixed my signature in presence of two witnesses.

WILLIAM H. ZACHMANN.

Witnesses:
    VICTOR D. BORST,
    BERNARD COWEN.